United States Patent
Gfroerer et al.

(10) Patent No.: US 11,300,516 B2
(45) Date of Patent: Apr. 12, 2022

(54) SYSTEM AND METHOD FOR INTENSITY STABILIZATION FOR QUANTITATIVE IMAGING

(71) Applicant: Molecular Devices (GmbH) Austria, Hallstein (AT)

(72) Inventors: Andreas Gfroerer, Hallein (AT); Frank Keidel, Hallein (AT); Bernhard Schinwald, Hallein (AT)

(73) Assignee: Molecular Devices (Austria) GmbH

( * ) Notice: Subject to any disclaimer, the term of this patent is extended or adjusted under 35 U.S.C. 154(b) by 0 days.

(21) Appl. No.: 16/964,744

(22) PCT Filed: Jan. 23, 2019

(86) PCT No.: PCT/IB2019/050578
§ 371 (c)(1),
(2) Date: Jul. 24, 2020

(87) PCT Pub. No.: WO2019/145880
PCT Pub. Date: Aug. 1, 2019

(65) Prior Publication Data
US 2020/0348235 A1 Nov. 5, 2020

Related U.S. Application Data

(60) Provisional application No. 62/622,311, filed on Jan. 26, 2018.

(51) Int. Cl.
G01N 21/64 (2006.01)

(52) U.S. Cl.
CPC ..... *G01N 21/6458* (2013.01); *G01N 21/6452* (2013.01)

(58) Field of Classification Search
CPC .................. G01N 21/6458; G01N 21/6452
See application file for complete search history.

(56) References Cited

U.S. PATENT DOCUMENTS 8,086,016 B2 * 12/2011 Kobayashi ............ G06T 7/0012
382/133

FOREIGN PATENT DOCUMENTS

EP 2697646 B1 2/2016

OTHER PUBLICATIONS

PCT International Preliminary Report on Patentability in International Application PCT/IB2019/050578, dated Aug. 6, 2020, 10 pgs.
(Continued)

*Primary Examiner* — David P Porta
*Assistant Examiner* — Meenakshi S Sahu
(74) *Attorney, Agent, or Firm* — Merchant & Gould P.C.

(57) ABSTRACT

A system (90) for imaging microscopic samples comprises a light source (31) for exciting fluorescence from at least one sample, a photosensor (40) configured to detect light deflected by a beam splitter (20) from an optical excitation path directed to the sample and output an electrical signal of optical flux to the sample, a camera (30) configured to receive and form an image of fluorescence light emitted from the sample, and a controller (134) comprising an integrator (122) configured to integrate the electrical signal from the photodetector and a comparator configured to compare the integrated output to a predetermined threshold, wherein the controller is configured to control an exposure time of the camera such that each sample receives substantially the same total optical flux of incident light during a duration of camera exposure which is terminated when a predetermined threshold representative of the total optical flux is met.

20 Claims, 5 Drawing Sheets

(56) References Cited

OTHER PUBLICATIONS

International Search Report and Written Opinion for PCT/US2019/050578 dated Apr. 26, 2019.

* cited by examiner

SYSTEM AND METHOD FOR INTENSITY STABILIZATION FOR QUANTITATIVE IMAGING

CROSS REFERENCE TO RELATED APPLICATION(S)

This application is a National Stage Application of PCT/IS2019/050578 filed on Jan. 23, 2019, which claims priority to and the benefit of U.S. Provisional Application No. 62/622,311 filed on Jan. 26, 2018, the entire disclosures of which are incorporated herein by reference in their entirety.

BACKGROUND OF THE INVENTION

Field of the Invention

This invention relates generally to the field of microscopic imaging of fluorescing samples.

Related Art

Fluorescent analyses are of significant importance in the pharmaceutical industry used to screen a variety of tissue types for interaction with chemical species of pharmaceutical interest.

In an analysis of these types, cells are typically cultured in a multiple well plate or microplate. The microplate has become a standard tool in analytical research and clinical diagnostic testing laboratories.

In order to measure the fluorescence image of the cells, the cells or cell cultures are illuminated with light of a first wavelength, and light emission at a second wavelength is monitored by an optical detector, usually a camera. The wavelength and/or intensity and/or the spatial distribution of the secondary emission (e.g., the fluorescence) can be correlated with cell number, cell viability, cell shapes, uptake of certain drugs and many other functional parameters of the cells and the cell culture.

SUMMARY

In one embodiment of the invention, there is provided a system for imaging microscopic samples. The system comprises a light source for exciting fluorescence from at least one sample, an excitation optical path comprising one or more objective lenses which directs light from the light source to an object plane coincident with the at least one sample, a beam splitter disposed along the excitation optical path and configured to separate a part of the light from the excitation optical path, a photosensor configured to detect the part of the light separated from the excitation optical path and output an electrical signal representative of optical flux to the at least one sample, a camera disposed at an image plane and configured to take an image of the fluorescence light emitted from the at least one sample, and a controller comprising an integrator configured to integrate the electrical signal from the photosensor and producing a totalized output and a comparator configured to compare the integrated output to a predetermined threshold, wherein the controller at least controls an exposure time of the camera such that each sample receives substantially the same total optical flux during a duration of camera exposure which is terminated when the predetermined threshold is reached.

In one embodiment of the invention, there is provided a method for imaging microscopic samples. The method comprises directing light from a light source to an object plane coincident with at least one sample, separating a part of the light to a photosensor outputting an electrical signal representative of optical flux to the at least one sample, forming an image of fluorescence light emitted from the at least one sample upon exposure to incident light from the light source; and controlling an exposure time of each image taken from the at least one sample such that, for a plurality of images taken, each sample receives substantially the same total optical flux of the incident light.

In one embodiment of the invention, there is provided a system for imaging microscopic samples. The system comprises means for directing light from a light source to an object plane coincident with at least one sample, means for measuring an intensity of a part of the light, means for imaging fluorescence light emitted from the at least one sample upon exposure to incident light from the light source, and means for controlling an exposure time of each image taken from the at least one sample such that, for a plurality of images taken, each sample receives substantially the same total optical flux of the incident light.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is to be understood that both the foregoing general description of the invention and the following detailed description are exemplary, but are not restrictive of the invention.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

For quantitative screening of a plurality of microscopic samples, it is essential that the images taken are reliable and efficiently referenced to exactly the same excitation power level. One conventional approach has been to detect the intensity during an acquisition for instance with a photodiode and use the measured value to correct the snapped image afterwards numerically.

Yet, state of the art high power LED sources for excitation of fluorescent samples exhibit a strong drift in their emission output. The drift (especially prominent during the warmup phase of the LED) makes fluoroscopic comparisons between different samples difficult.

The present invention addresses the problem of fluoroscopic comparisons between different samples where the drifts noted above or other changes in the light source or the optical path change the excitation intensity and thus change the fluorescence intensity.

Biologists are increasingly interested in exact quantification and comparability of data sets. Especially in the area of automated microscopy, it is important that the measurement conditions do not vary during the collection of larger data sets with many samples. With the present invention, all the samples from the first well in a sample holder to the last well in the sample holder are illuminated with the same amount (or substantially the same amount) of light. Thus, in one embodiment of the invention, for fluorescently labelled samples, the emitted fluorescence signal depends only on biological variations and not on instrument instability or drift.

Figure 1A:
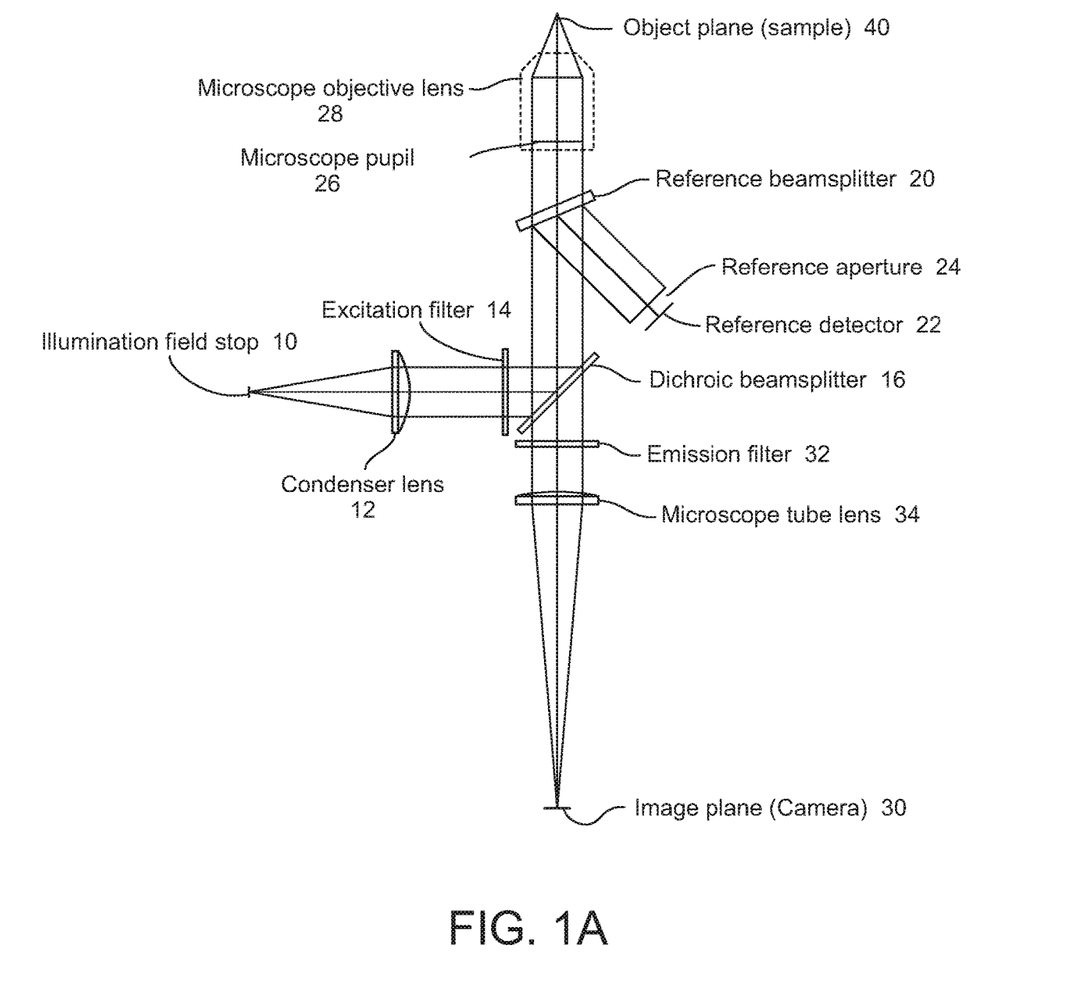
FIG. 1A is an optical schematic showing an optical pathway setup according to the invention.
Figure 2:
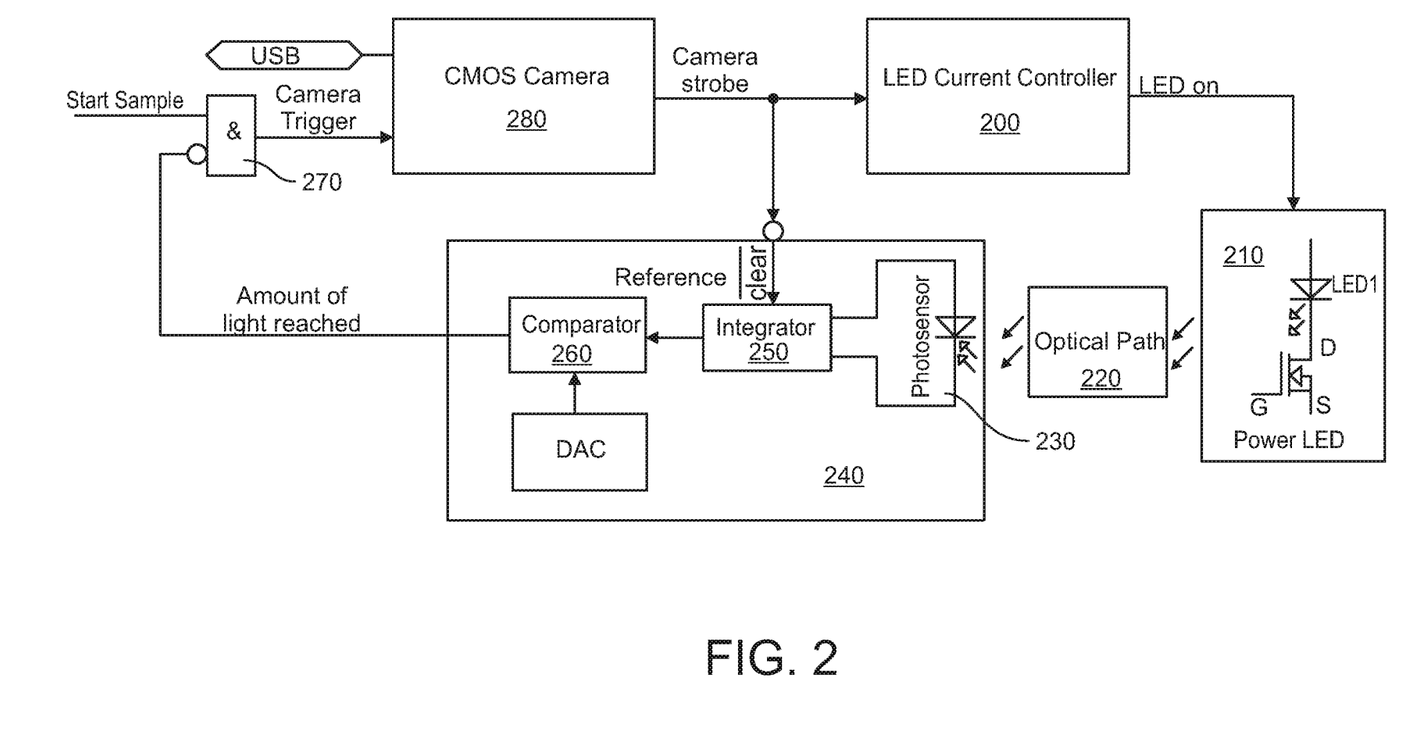
FIG. 2 is a schematic showing an electronic configuration for controlling light flux exposure of a sample.

FIG. 1A is an optical schematic showing an optical pathway setup, according to the invention. As shown in FIG. 1, excitation light enters the system from the left (at illumination field stop 10. The excitation light can come from for example a LED source (discussed below) via a fiber guide (both not shown in this FIG. 1A), but it also could be directly coupled with free space optics into the system As shown in FIG. 1A, a fixed fraction of the excitation light on the illumination path is directed by a reference beam splitter 20 to a reference photodiode 22 or otherwise separated from the illumination or optical path. Simultaneously or slightly before switching on the LED, the camera 30 is triggered to start exposure at the same time that light hits the photodiode 22. The photodiode signal is integrated until a predetermined threshold is reached. This threshold represents the exact amount of light that hits both the photodiode 22 and sample 40. As soon as the threshold is reached, the camera exposure is stopped, and the LED can be switched off. According to another embodiment it is sufficient if either the camera exposure or the LED is switched off as the threshold is reached and the other component is switched off thereafter. According to one embodiment of the invention, instead of exposing the sample 40 to the excitation light for a constant amount of time as conventional, the sample in each well is now exposed to a constant overall amount of photonic energy. The control scheme and electronics to realize this exposure is shown in FIG. 2 and discussed below.

As compared to the conventional numerical correction with a recorded or otherwise known correction factor, the present invention does not need to record reference levels and later numerically correct image data. In contrast to other conventional practice, the full dynamic range of the camera can be used Without effectively loosing part of the dynamic range due to the numerical correction. Additionally, with the flux-controlled exposure of the invention, quantitative measurements e.g. dose response curves or Z'-factor determinations can be performed very exactly. In quantitative cell biology, quantitative measurements and/or comparisons are of importance for ascertaining protein levels by fluorescence signal (e.g., important for expression levels, molecule counting, fluorescence recovery after photobleaching, fluorescence polarization microscopy, protein colocalization studies, protein dynamics, protein mobility, drug concentrations). Furthermore, quantitative measurements and/or comparisons are of importance in segmentation, 3D volume rendering, and deconvolution. In those fields of use, fluorescence intensity levels are compared between different samples, time points, and probes.

Without the additional numerical calculation (and time) to compensate the data images taken from for example on images containing megapixels of data (e.g., 4 or more megapixels, this invention is particularly useful for optimizing speed.

With more detail pertaining to FIG. 1A, light entering through the field stop 10 is incident on and collimated by condenser lens 12. An excitation filter 14 (to be described below) can be placed in line between the lens 12 and a dichroic beam splitter 16 (to be described below). Light from beam splitter 16 is directed along the optical path to the reference beam splitter 20 where a part of the light passes to reference detector 22 and another part of the light passes to sample 40. A reference aperture 24 can be placed between the reference beam splitter 20 and the reference detector 22, serving to eliminate stray light from other sources affecting the measurement of reference detector 22. A microscope pupil 26 and a microscope objective lens 28 are used to focus the light onto the sample 40 as well as collect emitted light (fluorescence or phosphorescence, for example). The collected light from the sample (e.g., from a sample well in a microplate) travels backward through the optical column passing through the reference beam splitter 20, beam splitter 16, optionally an emission filter 32, and a microscope tube lens 34 before arriving at image plane 30 where a camera is positioned.

In one embodiment of the invention, the beam splitter 20 is disposed inside of a microscopic setup upon which the camera is disposed, as shown in FIG. 1A. In another embodiment of the invention, the beam splitter 20 is disposed outside of the microscope. In another embodiment of the invention, the beam splitter 20 is disposed outside of the microscopic setup, and the fluorescent light (or phosphorescent light) imaged by the camera does not pass through a beam splitter, as there exists a first optical path for illuminating the sample (including the reference detector 22, and another (or second) optical path for imaging the fluorescence.

Figure 1B:
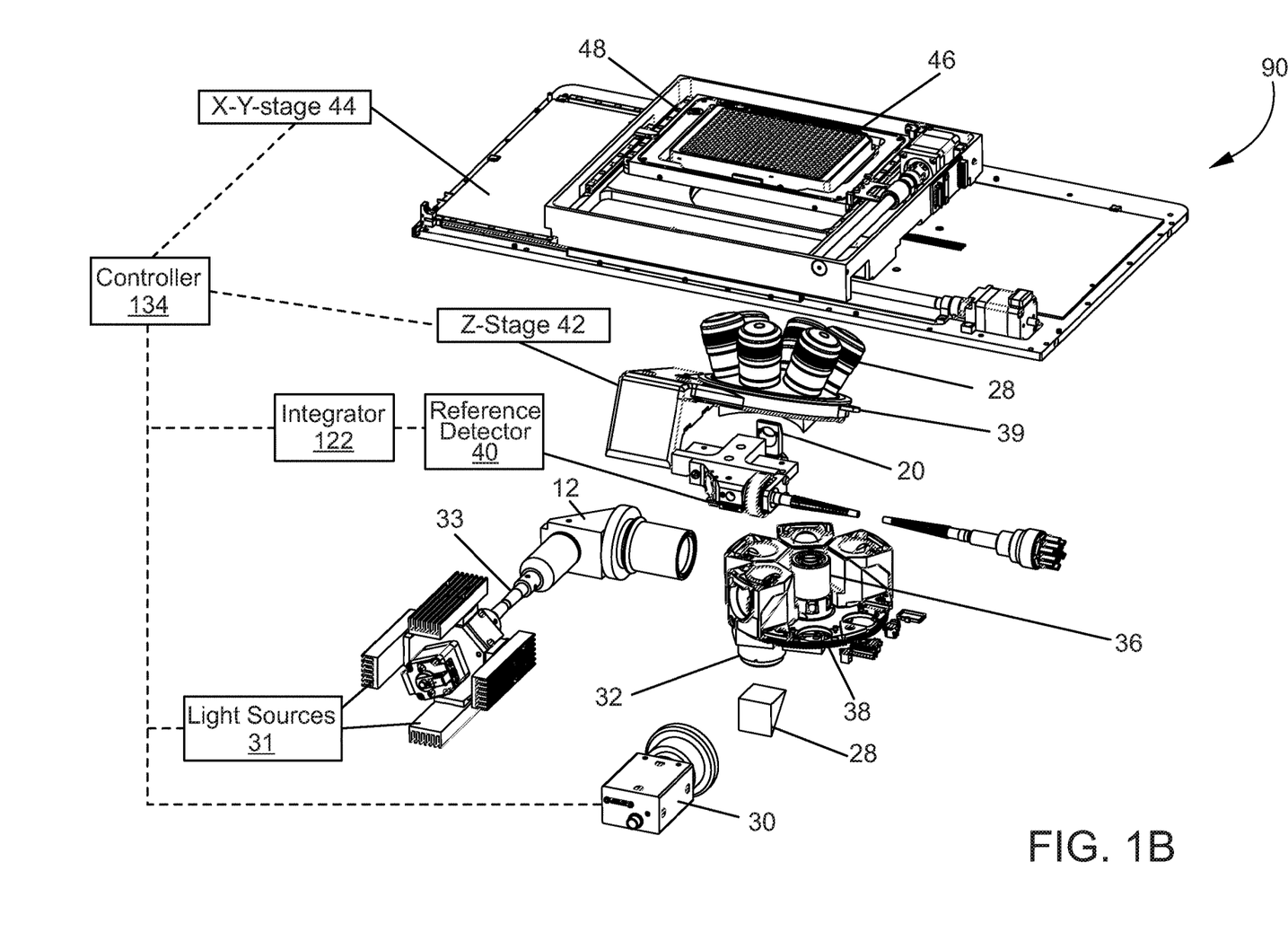
FIG. 1B is a schematic depicting a hardware implementation of the system shown in FIG. 1A.

FIG. 1B is a schematic depicting a hardware implementation of the system shown in FIG. 1A. In the microscopic setup 90 shown in FIG. 1B, light from excitation light source 31 is transferred to the condenser 12 by a light guide 33. The light guide 33 could comprise a glass, a plastic, a quartz fiber, it could be a liquid light guide, or it could comprise a fiber bundle. Light source 31 may include one or more LEDs (light emitting diodes), a lamp, or a laser. If the excitation light source 31 comprises multiple LEDs, as in the embodiment shown in FIG. 1B, LEDs with different emission wavelengths can be used to match the different excitation spectra of the fluorescent labels being imaged.

Exiting condenser 12, excitation light then passes through an excitation filter 14 and then to dichroic beam splitter 16 (otherwise referred to as a "dichroic"). For convenience, as shown in FIG. 1B, interference filters 14 (or other spectral filters) may be housed in filter cube 36, which itself is located on filter turret 38 so that the filters can be automatically switched between different filters or different sets of filters. Light encountering beam splitter 16 (included in the filter cube 36) is separated into a) a designated excitation wavelength for exposing the sample and b) an emission wavelength emitted from the fluorescent label of the sample being excited and imaged. Instead of a dichroic beam splitter, a spectrally neutral, e.g. a 50:50, beam splitter also could be used for beam splitter 16. The filter cube 36 typically holds the dichroics and the excitation and emission filters. In one embodiment of the invention, the spectral characteristics of the excitation filters, emission filters, and dichroics (grouped in one filter cube) typically match the spectral characteristics of the fluorescent label of the sample being excited and imaged. The filters and dichroics alternatively could be placed in filter wheels or filter sliders. Should the light source 31 be a monochromatic light source such as that of a laser or a laser diode, spectral filters for the excitation may not be needed.

Beam splitter 20 shown in FIG. 1B attached to the Z-stage 42 passes light toward the sample while separating a small and constant fraction thereof toward a detector such as the the reference detector 40 in FIG. 1B. Reference detector 40 can include therein a silicon photodiode or another type of a stable photodetector. Light integrator 122 receives and integrates the electrical signal from the photodetector. Light integrator 122 is in electrical communication with one or more of the light sources 31 and camera 30.

Controller 134 shown in FIG. 1B can be in electrical communication with integrator 122, light sources 31, camera 30, Z-stage 42, and X-Y stage 44. Z movement to match the sample with the focal plane of the objectives 28 is realized by moving the objective turret 39 in the z-direction. Z-movement alternatively also could be realized with an XYZ stage. As depicted in FIG. 1B, the X-Y stage 44 translates microplate 46 by way of moving holder 48 (which holds microplate 46 on the X-Y stage 44) such that the each well in the microplate can be exposed and the emitted light therefrom can be captured by camera 30. Fluoroscence (or phosphorescence) light emitted from the sample is directed back down through the optical path to a camera 30, located at the image plane Z shown in FIG. 1A. Prism 28 shown in FIG. 1B, which also could be a mirror, deflects the optical path for spatial compactness.

Integrator 122 is used such that all samples from the first well in microplate 46 to the last well are illuminated with the same amount (or substantially the same amount) of light or light energy as an exposure mode of the camera (described above) is controlled such that each sample receives substantially the same total optical flux during a duration of camera exposure terminated when a predetermined threshold is reached.

Accordingly, the sample (or composition) being imaged can include compounds, mixtures, surfaces, solutions, emulsions, suspensions, cell cultures, fermentation cultures, cells, tissues, secretions, and/or derivatives and/or extracts thereof. Analysis of the composition may involve measuring the presence, concentration, or physical properties (including interactions) of a photoactive analyte in such a composition. Composition may refer to the contents of a single microplate well, or several microplate wells, depending on the assay.

The sample or composition can be placed in microplates, biochips, or any array of samples in a known format. In apparatus shown in FIG. 1B, the sample carrier is microplate 46, which includes a plurality of microplate wells for holding compositions. Another typical sample carriers could be a microscope slide or a Petri dish. Microplates are multi-well (typically rectangular) holders that are normally cylindrical in shape although rectangular or other shaped wells are sometimes used. The sample wells are typically disposed in regular arrays. The "standard" microplate includes 96 cylindrical sample wells disposed in a 8×12 rectangular array on 9 millimeter centers.

A microplate typically has 6, 12, 24, 48, 96, 384 or 1536 sample wells arranged in a 2:3 rectangular matrix.

With reference to FIG. 2, FIG. 2 is a schematic showing an electronic configuration for controlling light flux exposure of a sample such that the same total flux is delivered to each sample well. In FIG. 2, LED current control 200 controls the current flowing to LED 210. Light emitted from LED 210 is emitted into the optical path 220 of the microscope where a part of the light is diverted to photosensor 230 functioning as reference detector 22. As shown in FIG. 2, photosensor 230 is part of flux controller 240. Included with the flux controller 240 is an integrator 250 which integrates or totalizes the voltage signal or output signal from photosensor 230. An output of integrator 250 is compared to a predetermined threshold by comparator 260.

To start an exposure, as one input to AND gate 270, the 'start sample' signal is set to a high state. The other input to the AND gate is an inverted 'low' signal coming from the comparator 260. Under this logic the camera 280 gets a positive 'start exposure' signal. The camera strobe output of camera 280 is used to switch on the LED by the current controller 200. The reference photosensor 230 starts to collect light, and its electrical output is integrated by integrator 250. During the integration, comparator 260 will set its output to a high state as soon as the predetermined threshold is reached. Via AND gate 270, the camera exposure input is set to low, camera 280 stops image collection, and its 'camera strobe' signal also switches to low. As a result, LED 210 is also switched off. This control scheme makes sure that each sample well and each well between different microplate is exposed to exactly the predetermined overall amount of excitation energy.

In one embodiment of the invention, sensitivity control of the integrator is also taken into consideration. The dynamic range of the integrator can be extended by this optional sensitivity control. The samples to be measured could cover a very wide range of concentrations, which results in a very wide dynamic range of signals, i.e. up to 5 orders of magnitude. Therefore, the amount of excitation energy has to be adapted accordingly. The amount of excitation energy translates into the accumulated signal of the integrator and then to the threshold comparison.

Testing

A prototype system for flux control has been integrated into an automated microscope, that was capable of imaging more than ninety six (96) microscopy target samples in a microplate such as those described above. The hardware based control of this invention (described above with reference to FIG. 2) resulted in a stable signal output for multiple samples and during multiple reads of a full microplate, where each well in the microplate had the same sample deposited before exposure.

Figure 3:
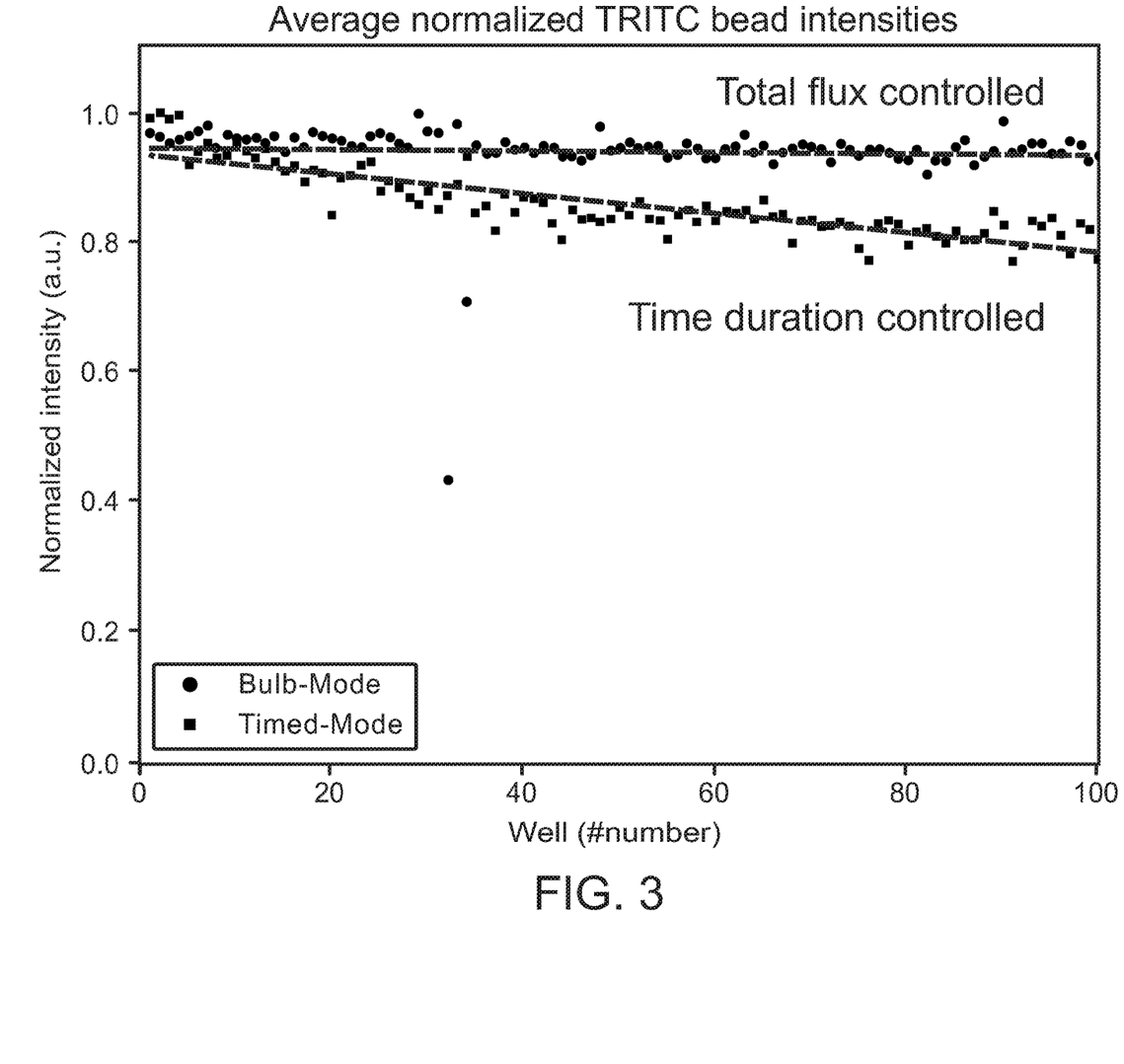
FIG. 3 is a graph depicting the results of conventional exposure and the flux-controlled exposure of the invention.

FIG. 3 shows typical data measured with this setup. A well of a microplate with fluorescently labelled beads in its 96 wells was measured 100 times with the energy controlled setup of FIG. 2 (total-flux-controlled) and compared to a measurement scheme with the conventional time duration controlled (=constant exposure time) setup. Apart from some statistical variations (mainly due to the autofocus that is done for each measurement), the intensity with the total-flux-controlled procedure (the upper set of points) remains substantially constant throughout the whole experiment, as seen by the relatively constant fluorescence. Whereas in the conventional time duration controlled exposure (the lower set of points), an intensity decrease of approximately 20% was observed.

In one embodiment of the invention, there is provided a system (as part of a microscopic setup) for imaging microscopic samples. The system comprises an optical excitation path which directs light from a light source to at least one sample, a photosensor configured to output an electrical signal representative of optical flux to the at least one sample, a camera configured to capture an image of fluorescence light emitted from the at least one sample, and a controller configured to control an exposure time of the camera such that each sample receives substantially the same total optical flux during a duration of camera exposure which is terminated when a predetermined threshold representative of the total optical flux is reached. This system can include at least one light source for exciting fluorescence from at least one sample. The optical excitation path can comprise one or more objective lenses which directs light from the light source to an object plane coincident with the at least one sample. This system can comprise (as noted above) a microplate holding multiple samples.

The camera can measure multiple samples. The controller can direct measurements of the samples in sequence from one sample to another sample. Alternatively, the controller can direct a time lapse sequence which measures the same samples multiple times.

In this system, the photosensor is exposed to light separated from the optical excitation path, but not necessarily from a beam splitter. Alternatively, the light directed to the one or more samples can be separated by a beam splitter disposed inside (or outside) of the microscopic setup of which the camera is disposed. In this system, fluorescent light imaged by the camera may or may not pass through a beam splitter.

System Controls

Figure 4:
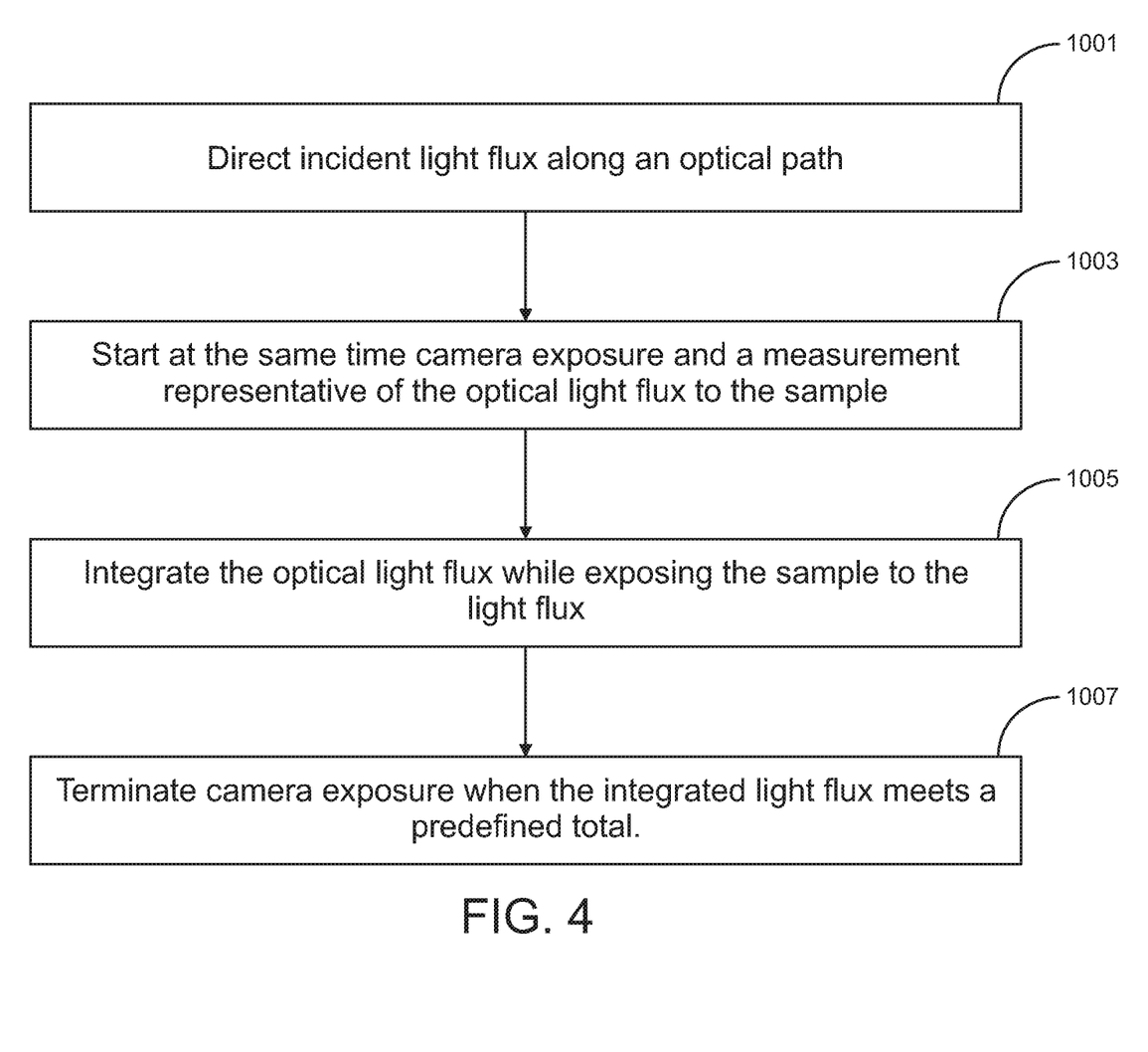
FIG. 4 is a flow chart depicting an exemplary method for sample imaging according to the invention.

In one embodiment of the invention, there is provided a method for sample imaging. FIG. 4 is a flow chart depicting an exemplary method for sample imaging according to the invention. At 1001, light flux (from a source) is directed along optical path to a sample. At 1003, both camera exposure, LED and a measurement representative of the optical light flux to the sample are started at the same time. At 1005, the measurement representative of the optical light flux is integrated (summed or totalized) while exposing the sample to the light flux. At 1007, the camera exposure and/or the light source is terminated when the integrated light flux meets (or reaches) a predefined total (i.e., a predetermined threshold).

In general, the method for imaging microscopic samples can direct light to an object plane (e.g., object plane 30) coincident with at least one sample, separate a part of the light directed to the at least one sample to a photosensor (e.g., reference detector 22) outputting an electrical signal representative of optical flux to the at least one sample, form an image of fluorescence (or phosphorescence) light emitted from the at least one sample, and control an exposure of each image taken from the at least one sample by a camera (e.g., cameras 30 and 280) such that, for a plurality of images taken, each sample receives substantially the same total optical flux.

The method for imaging microscopic samples can (as in FIG. 2) integrate an electrical signal from the photosensor 230 to produce a totalized or integrated output; and compare the totalized or integrated output to a predetermined threshold. The method can set the camera (e.g., camera 280) into an exposure mode before or simultaneously when a light source 210 is switched on. The method can, after the light source 210 is switched on, start integration of the electrical signal from the photosensor, and turn the camera off when the predetermined threshold is reached. The method can turn the light source 210 off when the predetermined threshold is reached.

The method for imaging microscopic samples can measure the samples in sequence from one sample to another sample, or can measure a time lapse sequence which measures the same sample (or between different samples) multiple times.

In one embodiment of the invention, one or more controllers implemented in hardware/electronics or software program code may be used to perform any or all of the functions described above. For example, controllers having appropriate electronic circuitry or a software program code can be used separately or in conjunction with hardware in light integrator 122, controller 134, cameras 30 or 280, LED controller 200, and flux controller 240 to perform some or all of the functions described above. Accordingly, such processors can operate with a computer readable medium having program code included in memory (e.g., ROM, EPROM, EEPROM, flash memory, static memory, DRAM, SDRAM, and their equivalents) which when executed in a system for imaging samples, performs the following steps of: turning on or off a light source to direct light to an object plane coincident with at least one sample, measuring an electrical signal output from a photosensor receiving a part of the light directed to the at least one sample; receiving from a camera an image of fluorescence or phosphorescence light emitted from the at least one sample, and controlling an exposure of each image taken from the at least one sample by the camera such that, for a plurality of images taken, each sample receives substantially the same total optical flux.

The program code may further execute separately or in conjunction with the electronic circuitry the steps of: integrating an electrical signal from the photosensor to produce a totalized output, and comparing the totalized output to a predetermined threshold. The program code (or the electronic circuitry may further start the camera exposure before or simultaneously when a light source is switched on. The program code (or the electronic circuitry) may further after the light source is switched on, start integration of the electrical signal from the photosensor, and when the predetermined threshold is reached, turn the camera off. The program code (or the hardware) may further turn the light source off when the predetermined threshold is reached.

This invention therefore includes in one embodiment a system for imaging microscopic samples. The system comprises means for directing light to an object plane coincident with at least one sample, means for measuring an intensity of a part of the light directed to the at least one sample, means for imaging fluorescence light emitted from the at least one sample, and means for controlling an exposure of each image taken from the at least one sample by the camera such that, for a plurality of images taken, each sample receives substantially the same total optical flux.

This invention therefore includes in another embodiment a system for imaging microscopic samples. The system comprises means for turning on or off a light source to direct light to an object plane coincident with at least one sample, means for measuring an electrical signal output from a photosensor receiving a part of the light directed to the at least one sample, means for receiving from a camera an image of fluorescence or phosphorescence light emitted from the at least one sample, and means for controlling an exposure of each image taken from the at least one sample by the camera such that, for a plurality of images taken, each sample receives substantially the same total optical flux.

Although the previous description only illustrates particular examples of various implementations, the invention is not limited to the foregoing illustrative examples. A person skilled in the art is aware that the invention as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. It is not exhaustive and does not limit the claimed inventions to the precise form disclosed. Modifications and variations are possible in light of the above description or may be acquired from practicing the invention. It is therefore to be understood that within the scope of the appended claims, the invention may be practiced otherwise than as specifically described herein.

The invention claimed is:

1. A system for imaging a plurality of microscopic samples, comprising:
    a light source for exciting fluorescence from the plurality of microscopic samples;
    an optical excitation path comprising one or more objective lenses which directs light from the light source to an object plane coincident with the plurality of microscopic samples;
    wherein the one or more objective lenses enable the camera to simultaneously image each sample of the plurality of microscopic samples;
    a beam splitter disposed along the optical excitation path and configured to separate a part of the light from the optical excitation path;
    a photosensor configured to detect the part of the light separated from the optical excitation path and output an electrical signal representative of optical flux to each sample of the plurality of microscopic samples;
    a camera configured to capture an image of fluorescence light emitted from each sample of the plurality of microscopic samples;
    a controller comprising an integrator configured to integrate each of the electrical signals from the photosensor and produce an integrated output of optical flux from each sample of the plurality of microscopic samples; and
    a comparator configured to compare the integrated output of optical flux from each sample of the plurality of microscopic samples to a predetermined optical flux threshold,
    wherein the controller at least controls an exposure of the camera such that each sample of the plurality of microscopic samples simultaneously receives substantially the same total optical flux during the exposure of the camera,
    wherein the exposure of the camera is terminated when the predetermined optical flux threshold for each sample of the plurality of microscopic samples is reached.

2. The system of claim 1, wherein the controller is implemented by one of electronic circuitry or program code, or a combination of the two, to integrate the electrical signal, produce the integrated output, and compare the integrated output to the predetermined threshold.

3. The system of claim 2, wherein:
    the controller is configured to start the camera exposure before or simultaneously when the light source is switched on,
    after the light source is switched on, the integrator integrates the electrical signal from the photosensor, and
    when the predetermined threshold is reached, the exposure time of the camera is terminated.

4. The system of claim 1, wherein
    when the predetermined threshold is reached, the light source is switched off.

5. The system of claim 1, further comprising filter sets for fluorescence measurements.

6. The system of claim 1, wherein the light source is coupled into a microscopic setup with a fiber optic.

7. The system of claim 1, wherein the one or more objective lenses permit multiple magnifications of the at least one sample.

8. The system of claim 1, further comprising a holder for microplates holding multiple samples, wherein the camera measures multiple samples.

9. The system of claim 1, wherein the controller directs a time lapse sequence which measures between different samples multiple times.

10. The system of claim 1, wherein the beam splitter is disposed inside of a microscopic setup of which the camera is disposed.

11. The system of claim 1, wherein the beam splitter is disposed outside of a microscopic setup of which the camera is disposed.

12. The system of claim 1, wherein the fluorescent light imaged by the camera does not pass through the beam splitter.

13. A system for imaging a plurality of microscopic samples, comprising:
    an optical excitation path which directs light from a light source to the plurality of microscopic samples;
    a photosensor configured to output an electrical signal representative of optical flux to each sample of the plurality of microscopic samples;
    a camera configured to receive an image of fluorescence light emitted from each sample of the plurality of microscopic samples; and
    a controller configured to control an exposure of the camera such that each sample of the plurality of microscopic samples simultaneously receives substantially the same total optical flux during the exposure of the camera,
    wherein the exposure of the camera is terminated when the predetermined optical flux threshold for each sample of the plurality of microscopic samples is reached.

14. A method for imaging a plurality of microscopic samples, comprising:
    directing light from a light source to an object plane coincident with the plurality of microscopic samples;
    separating a part of the light to a photosensor outputting an electrical signal representative of optical flux to each sample of the plurality of microscopic samples;
    forming an image of fluorescence light emitted from each sample of the plurality of microscopic samples upon exposure to incident light from the light source; and
    controlling an exposure of each image taken of each sample of the plurality of microscopic samples such that, for the plurality of images taken, each sample of the plurality of microscopic samples simultaneously receives substantially the same total optical flux of the incident light.

15. The method of claim 9, further comprising:
    integrating an electrical signal from the photosensor to produce a totalized output; and
    comparing the totalized output to a predetermined threshold.

16. The method of claim 9, further comprising:
starting the camera exposure before or simultaneously when the light source is switched on, after the light source is switched on, integrating the electrical signal from the photosensor, and
when the predetermined threshold is reached, terminating the exposure time of the camera.

17. The method of claim 11, further comprising:
when the predetermined threshold is reached, turning the light source off.

18. The method of claim 9, further comprising:
when the predetermined threshold is reached, turning the light source off.

19. The method of claim 9, further comprising measuring the samples in sequence from one sample to another sample.

20. A computer readable medium having program code which when executed on a processor in the system of claim 1, performs the following steps of:

turning on or off a light source to direct light to an object plane coincident with a plurality of microscopic samples;

measuring an electrical signal output from a photosensor receiving a part of the light;

receiving from a camera an image of fluorescence light emitted from each sample of the plurality of microscopic samples upon exposure to incident light from the light source; and controlling an exposure of each image taken of each sample of the plurality of microscopic samples by the camera such that, for the plurality of images taken, each sample of the plurality of microscopic samples simultaneously receives substantially the same total optical flux of the incident light.

* * * * *